(12) United States Patent
Stabler et al.

(10) Patent No.: US 10,596,547 B2
(45) Date of Patent: Mar. 24, 2020

(54) POROUS ARTICLE HAVING POLYMER BINDER SUB-MICRON PARTICLE

(71) Applicant: Arkema Inc., King of Prussia, PA (US)

(72) Inventors: Sean M. Stabler, Pottstown, PA (US); Evan E. Koslow, Dallas, TX (US)

(73) Assignee: Arkema Inc., King of Prussia, PA (US)

( * ) Notice: Subject to any disclaimer, the term of this patent is extended or adjusted under 35 U.S.C. 154(b) by 196 days.

(21) Appl. No.: 15/567,183

(22) PCT Filed: Apr. 18, 2016

(86) PCT No.: PCT/US2016/028032
§ 371 (c)(1),
(2) Date: Oct. 17, 2017

(87) PCT Pub. No.: WO2016/172017
PCT Pub. Date: Oct. 27, 2016

(65) Prior Publication Data
US 2018/0104670 A1    Apr. 19, 2018

Related U.S. Application Data

(60) Provisional application No. 62/150,905, filed on Apr. 22, 2015.

(51) Int. Cl.
| | |
|---|---|
| *B01D 39/20* | (2006.01) |
| *B01J 20/04* | (2006.01) |
| *B01J 20/18* | (2006.01) |
| *B01J 20/20* | (2006.01) |
| *B01J 20/28* | (2006.01) |
| *B01J 20/30* | (2006.01) |
| *B01J 39/14* | (2006.01) |
| *B01J 47/018* | (2017.01) |
| *B01J 20/06* | (2006.01) |
| *B01J 20/08* | (2006.01) |
| *B01J 20/10* | (2006.01) |
| *B01J 20/14* | (2006.01) |
| *B01J 20/26* | (2006.01) |

(52) U.S. Cl.
CPC .... *B01J 20/28004* (2013.01); *B01D 39/2062* (2013.01); *B01D 39/2079* (2013.01); *B01J 20/048* (2013.01); *B01J 20/06* (2013.01); *B01J 20/08* (2013.01); *B01J 20/103* (2013.01); *B01J 20/14* (2013.01); *B01J 20/18* (2013.01); *B01J 20/20* (2013.01); *B01J 20/205* (2013.01); *B01J 20/262* (2013.01); *B01J 20/2803* (2013.01); *B01J 20/28011* (2013.01); *B01J 20/3007* (2013.01); *B01J 20/3042* (2013.01); *B01J 39/14* (2013.01); *B01J 47/018* (2017.01); *B01D 2239/0407* (2013.01); *B01D 2239/086* (2013.01); *B01D 2239/1208* (2013.01); *B01D 2239/1216* (2013.01); *B01D 2239/1241* (2013.01)

(58) Field of Classification Search
None
See application file for complete search history.

(56) References Cited

U.S. PATENT DOCUMENTS

| | | |
|---|---|---|
| 5,147,722 A | 9/1992 | Koslow |
| 5,331,037 A | 7/1994 | Koslow |
| 6,395,190 B1 | 5/2002 | Koslow et al. |
| 6,540,815 B1 | 4/2003 | Hiltzik et al. |
| 7,144,533 B2 | 12/2006 | Koslow |
| 7,179,382 B2 | 2/2007 | Hiltzik et al. |
| 7,306,111 B2 | 12/2007 | Koslow |
| 7,435,462 B2 | 10/2008 | Edgecombe |
| 7,928,158 B2 | 4/2011 | Rodak et al. |
| 8,814,987 B2 | 8/2014 | Tschantz et al. |
| 9,533,251 B2 | 1/2017 | Tschantz |
| 2005/0098495 A1* | 5/2005 | Hughes ............ B01D 39/2055 210/502.1 |
| 2009/0001012 A1* | 1/2009 | Kepner ............... A01N 25/34 210/287 |
| 2009/0191250 A1* | 7/2009 | Gooch .................. A01N 47/44 424/405 |
| 2011/0162667 A1 | 7/2011 | Burke et al. |
| 2011/0210062 A1 | 9/2011 | Wang et al. |
| 2012/0015246 A1 | 1/2012 | Amin-Sanayei et al. |
| 2012/0073632 A1 | 3/2012 | Kosar et al. |
| 2014/0027679 A1 | 1/2014 | Kim et al. |
| 2015/0030906 A1 | 1/2015 | Amin-Sanayei et al. |
| 2015/0231575 A1 | 8/2015 | Starostine et al. |
| 2015/0231576 A1* | 8/2015 | Stabler ................ B01D 39/163 210/500.35 |
| 2016/0121249 A1 | 5/2016 | Koslow |

FOREIGN PATENT DOCUMENTS

WO    WO 2014/055473 A2    4/2014

* cited by examiner

*Primary Examiner* — Bradley R Spies
(74) *Attorney, Agent, or Firm* — Joanne Rossi

(57) ABSTRACT

The invention relates to a solid porous article containing sub-micron functional additive particles held together using discrete sub-micron polymer binder particles. The porous article preferably also contains a majority of primary active particles in the 1 to 300 micron range. The solid porous articles are used to separate, precipitate, and/or trap components of a fluid that passes through the porous article. The solid porous articles are used to separate and trap components of a fluid that passes through the porous article. Preferred binders are polyvinylidene fluoride resins, such as Kyblock® resins from Arkema Inc.

15 Claims, No Drawings ated carbon or binder, then adding a
POROUS ARTICLE HAVING POLYMER BINDER SUB-MICRON PARTICLE This application claims benefit, under U.S.C. § 119 or § 365 of PCT Application Number PCT/US2016/028032, filed Apr. 18, 2016; and U.S. Provisional Application No. 62/150,905, filed Apr. 22, 2017; said applications incorporated herein by reference.

FIELD OF THE INVENTION

The invention relates to a solid porous article containing sub-micron functional additive particles held together using discrete sub-micron polymer binder particles. The porous article preferably also contains a majority of primary active particles in the 1 to 300 micron range. The solid porous articles are used to separate, precipitate, and/or trap components of a fluid that passes through the porous article.

BACKGROUND OF THE INVENTION

Composite porous solid articles, such as porous separation articles and carbon block filtration articles, are known in the art. These articles are produced using mixtures of thermoplastic binders and active particles or fibrous materials such as activated carbon powder. The articles preferably are formed under conditions effective to permit the thermoplastic binder to connect the active particles or fibrous materials in discrete spots, rather than as a coating, forming an interconnected web. This arrangement permits the active powdery or fibrous materials to be in direct contact with, and to interact with, a fluid or gas. The resulting composite solid article is porous, thereby permitting the fluid or gas to penetrate into and pass through the article. Such articles are especially useful in water purification, purification of organic waste streams, and in biological separations.

U.S. Pat. No. 6,395,190 describes carbon filters and a method for making them having a 15 to 25 weight percent of a thermoplastic binder, where the average particle size is from 5 to 25 microns; and having activated carbon particles where the majority of the particles are in the 200-325 mesh range (44-74 microns), with the rest of the activated carbon is less than 325 mesh.

Poly(vinylidene fluoride) as a binder for a porous block article, has been found to improve the performance of the article by providing effective binding at lower loading—which in turn opens more of the surface of the active agent (like activated carbon, zeolites or ion exchange agents)—providing even greater efficiency.

Examples of such composite porous solid articles, as well as methods for producing them, are described for example in WO 2014/055473 and WO 2014/182861, the entire disclosures of each of which are incorporated herein by reference for all purposes. These articles use polyvinylidene fluoride or polyamide binders, rather than the polyethylene binders previously used for carbon block filtration articles.

In some applications, it is desired to add additional functionality to the porous block article, such as the addition of an antimicrobial agent. An agent, such as AgBr has been added to a porous block article, as described in U.S. Pat. No. 7,144,533 and US 2011/0210062. Each of these references describes a complicated method for adding a metal (preferably Ag or Cu) salt into a filtration device, involving first charging the activated carbon or binder, then adding a charged microbiological interception agent. AgBr can be added at about 0.05 to 0.5%, with a particle size of about a micron.

There is a relationship between the level of loading of particulate agents, the size of the agent, and the available surface area of the agent. It is desired to have a large amount of surface area of a particulate agent available, to maximize effectiveness as a filtration/active agent. Small functional particles provide the most surface area—and thus the highest distribution efficiency per weight of agent by volume of filtration article. Yet, the smaller the particle, the more of the binder surface will be clogged with particulate agent—meaning less binder surface is available to actually bind the primary particles. In the art this is handled by either using large functional particles (generally 5 microns or larger)—about the same size as the primary particles like activated carbon), or else nano-sized functional additive particles could be used, but only a low levels (far less than 1% and preferably less than 0.5%). Alternatively, a higher level of binder could be employed, but the more binder, the less surface area of the primary particles is available for filtration. Many of the functional additives are available in nano-size—having large surface areas available for reactions.

The problem solved by this invention is to add higher loadings of functionalization to a solid porous separation article, while maintaining sufficient mechanical strength to prevent collapse of the article during a pressurized fluid flow.

Surprisingly, it has now been found that by using discrete polymer binder particles of 50 to 500 nm, high loading (>0.5 wt %) of nano-particles can be achieved, while the binder remains effective to bind the primary active particles. The nano-particles achieve good dispersion

SUMMARY OF THE INVENTION

The invention relates to a solid porous article comprising:
a) a thermoplastic polymeric binder in the form of particles having an average particle discrete size of from 20 nm to 1 micron, preferably 50 to 400 nm, and most preferably 50-300 nm, and
b) at least 50 weight percent, preferably 60 weight percent, preferably 70 weight percent of primary particles, and
c) greater than 0.5 weight percent, preferably greater than 0.7 weight percent, more preferably greater than 1.0 weight percent, preferably greater than 5 weight percent, and more preferably greater than 10 weight percent, based on the total weight of the solid porous article, of particles having an average particle size of from 5 nm to 10,000 nm, preferably from 10 to 5,000 nm, more preferably from 20 to 1,000 nm, and most preferably from 25 to 1,000 nm.

Alternatively, the solid porous article could contain binder and only primary particles of differing average particle size, with some of the primary particles having an average particle size of less than one micron, preferably less than 750 nm, and more preferably less than 500 nm.

The Invention also relates to processes to form these solid porous articles, and uses thereof.

DETAILED DESCRIPTION OF THE INVENTION

As used herein, the term "polymer" is used to mean homopolymers, copolymers, or any polymer having three or more different monomer units. The polymer can be random, block, star, or any other arrangement, and can be formed by any polymerization means, such as batch, continuous, emulsion, and suspension.

The references cited in this application are incorporated herein by reference.

"Interconnectivity", as used herein means that the active particles or fibers are permanently bonded together by the polymer binder particles without completely coating the active primary and secondary particles or functional particles or fibers. The binder adheres the active particles together at specific discrete points to produce an organized, porous structure. The porous structure allows a fluid to pass through the interconnected particles or fibers, and the fluid composition is exposed directly to the surface(s) of the active particles or fibers, favoring the interaction of the particles with components of the fluid composition, and resulting in selective separation of the components. Since the polymer binder adheres to the active particles in only discrete points, less binder is used for full connectivity then in a coating.

Percentages, as used herein are weight percentages, unless noted otherwise, and molecular weights are weight average molecular weights, unless otherwise stated.

Polymers Binder

The polymer binder particles of the composite of the invention are thermoplastic polymer discrete particles in the sub-micron range. The weight average particle size is less than 1 micron, preferably less than 500 nm, preferably less than 400 nm, and more preferably less than 300 nm. The weight average particle size is generally at least 20 nm and preferably at least 50 nm. In some cases the particles can agglomerate into agglomerates in the 2-50 micron range. Preferably the level of agglomerates is minimal, as the discrete particles provide for better binding.

Useful polymer binders of the invention are thermoplastic and include, but are not limited to, fluoropolymers, styrene-butadiene rubbers (SBR), ethylene vinyl acetate (EVA), acrylic polymers such as polymethyl methacrylate homopolymer and copolymers, polyurethanes, styrenic polymers, polyamides, polyester including polyethylene terephthalate, polyvinyl chlorides, polycarbonate, polyolefins, and thermoplastic polyurethane (TPU). In order to obtain the small polymer particle size useful in the invention, it is preferred that the thermoplastic polymers can be made by emulsion (or inverse emulsion) polymerization.

Thermoplastic polymers having low crystallinity, or no crystallinity are especially useful, as they are more flexible, are more easily softened, and withstand the pressures of the manufacturing process better than crystalline polymer.

Preferred polymers are polyamides, and fluoropolymers, with homopolymers and copolymers of polyvinylidene fluoride being especially useful.

Preferably, the binder is a fluoropolymer. Useful fluoropolymers are thermoplastic homopolymers and copolymers having greater than 40 weight percent of fluoromonomer units by weight, preferably more than 50 weight percent, preferably more than 65 weight percent, more preferably greater than 75 weight percent and most preferably greater than 90 weight percent of one or more fluoromonomers. Useful fluoromonomers for forming the fluoropolymer include but are not limited to: vinylidene fluoride (VDF or $VF_2$), tetrafluoroethylene (TFE), trifluoroethylene (TrFE), chlorotrifluoroethylene (CTFE), hexafluoropropene (HFP), vinyl fluoride (VF), hexafluoroisobutylene (HFIB), perfluorobutylethylene (PFBE), pentafluoropropene, 3,3,3-trifluoro-1-propene, 2-trifluoromethyl-3,3,3-trifluoropropene, fluorinated vinyl ethers including perfluoromethyl ether (PMVE), perfluoroethylvinyl ether (PEVE), perfluoropropylvinyl ether (PPVE), perfluorobutylvinyl ether (PBVE), longer chain perfluorinated vinyl ethers, fluorinated dioxoles, partially- or per-fluorinated alpha olefins of $C_4$ and higher, partially- or per-fluorinated cyclic alkenes of $C_3$ and higher, and combinations thereof.

Especially preferred fluoropolymers are polyvinylidene fluoride (PVDF) homopolymers, and copolymers, and polytetrafluroethylene (PTFE) homopolymers and copolymers. While the invention applies to all thermoplastic polymers, and in particular all fluompolymers and copolymers, vinylidene fluoride polymers will be used to illustrate the invention, and are the preferred polymer. One of ordinary skill in the art will understand and be able to apply the specific references to PVDF to these other thermoplastic polymers, which are considered to be within the realm of, and embodied in the invention.

In one embodiment, vinylidene fluoride copolymers are preferred, due to their lower crystallinity (or no crystallinity), making them more flexible than the semi-crystalline PVDF homopolymers. Flexibility of the binder provides advantages of a more flexible electrode that can better withstand the manufacturing process, as well as increased pull-through strength and better adhesion properties. Such copolymers include those containing at least 50 mole percent, preferably at least 75 mole %, more preferably at least 80 mole %, and even more preferably at least 85 mole % of vinylidene fluoride copolymerized with one or more comonomers selected from the group consisting of tetrafluoroethylene, trifluoroethylene, chlorotrifluoroethylene, hexafluoropropene, vinyl fluoride, pentafluoropropene, tetrafluoropropene, trifluoropropene, perfluoromethyl vinyl ether, perfluoropropyl vinyl ether and any other monomer that would readily copolymerize with vinylidene fluoride.

In one embodiment, up to 30%, preferably up to 25%, and more preferably up to 15% by weight of hexafluoropropene (HFP) units and 70% or greater, preferably 75% or greater, more preferably 85% or greater by weight or more of VDF units are present in the vinylidene fluoride polymer. It is desired that the HFP units be distributed as homogeneously as possible to provide PVDF-HFP copolymer with excellent dimensional stability in the end-use environment.

The PVDF for use as a binder in the composition preferably has a high molecular weight. By high molecular weight, as used herein is meant PVDF having a melt viscosity of greater than 1.0 kilopoise, preferably greater than 5 Kpoise, more preferably greater than 10 Kpoise, and most preferably greater than 15 Kpoise, according to ASTM method D-3835 measured at 450° F. and 100 $sec^{-1}$.

The PVDF used in the invention is generally prepared by means known in the art, using aqueous free-radical emulsion polymerization—although suspension, solution and supercritical $CO_2$ polymerization processes may also be used. In a general emulsion polymerization process, a reactor is charged with deionized water, water-soluble surfactant capable of emulsifying the reactant mass during polymerization and optional paraffin wax antifoulant. The mixture is stirred and deoxygenated. A predetermined amount of chain transfer agent (CTA) is then introduced into the reactor, the reactor temperature raised to the desired level and vinylidene fluoride (and possibly one or more comonomers) are fed into the reactor. Once the initial charge of vinylidene fluoride is introduced and the pressure in the reactor has reached the desired level, an initiator emulsion or solution is introduced to start the polymerization reaction. The temperature of the reaction can vary depending on the characteristics of the initiator used and one of skill in the art will know how to do so. Typically the temperature will be from about 30° to 150° C., preferably from about 60° to 120° C. Once the desired amount of polymer has been reached in the reactor, the monomer feed will be stopped, but initiator feed is optionally continued to consume residual monomer. Residual gases (containing unreacted monomers) are vented and the latex recovered from the reactor.

The surfactant used in the polymerization can be any surfactant known in the art to be useful in PVDF emulsion polymerization, including perfluorinated, partially fluorinated, and non-fluorinated surfactants. Preferably the PVDF emulsion of the invention is fluorosurfactant-free, with no fluorosurfactants being used in any part of the polymerization. Non-fluorinated surfactants useful in the PVDF polymerization could be both ionic and non-ionic in nature including, but are not limited to, 3-allyloxy-2-hydroxy-1-propane sulfonic acid salt, polyvinylphosphonic acid, polyacrylic acids, polyvinyl sulfonic acid, and salts thereof, polyethylene glycol and/or polypropylene glycol and the block copolymers thereof, alkyl phosphonates and siloxane-based surfactants.

The PVDF polymerization results in a latex generally having a solids level of 10 to 60 percent by weight, preferably 10 to 50 percent.

The level of polymeric binder in the porous separation article ranges from 1 to 30 weight percent, preferably from 3 to 17 weight percent, more preferably from 5 to 14 weight percent.

Active particles

One or more types of primary active particles or fibers are combined with the thermoplastic polymer binder. The active particles or fibers are not merely fillers or pigments, but are those which have a physical, electrical, or chemical interaction when they come into proximity or contact with dissolved or suspended materials in a fluid (liquid or gas) composition. They can also be materials useful in battery electrodes for conductance of electrons. Depending on the type of activity of the active particles, the particles may separate the dissolved or suspended materials from a fluid by chemical reaction, physical entrapment, physical attachment, electrical (charge or ionic) attraction, or similar means. Examples of interactions anticipated by the invention include, but are not limited to: physical entrapment of compounds from the fluid, such as in activated carbon, nano clays, or zeolite particles; ion exchange resins; catalysts; electromagnetic particles; acid or basic particles for neutralization; carbonaceous materials for a negative electrode; a Li plus transition metal oxide, sulfide or hydroxide for a positive electrode; silver based compounds for antimicrobials, organic and inorganic heavy metal reducers, etc.

The primary active particles make up over 50 weight percent, preferably over 60 weight percent, and more preferably over 70 weight percent of the total weight of the solid porous article. Useful primary particles include, but are not limited to activated alumina, activated carbon, carbon nanotubes, silica gel, acrylic powders and fibers, cellulose fibers, glass beads, various abrasives, common minerals such as silica, wood chips, ion-exchange resins, molecular sieves, ceramics, zeolites, ion-exchange modified zeolites, diatomaceous earth, talc polyester particles and fibers, graphite, carbon black, metal oxides, lithium ion-transition metal salts, and particles of engineering resins such as polycarbonate.

More than one type of primary active particles are also anticipated by the invention.

The primary active particles of the invention are generally in the size range of 0.1 to 3,000 microns, and preferably from 1.0 to 500 microns in diameter and fibers of 0.1 to 250 micrometers in diameter of essentially unlimited length to width ratio, and unlimited surface areas. In the art, primary particles are exemplified in the 3 to 500 micron average particle size—similar to the size of the polyethylene or other thermoplastic polymer binder. Fibers are preferably chopped to no more than 5 mm in length. Fibers cannot easily go through a spray dryer, but could be used in composites dried by other means. Fibers or powders should have sufficient thermal conductivity to allow heating of the powder mixtures. In addition, in an extrusion process, the particles and fibers must have melting points sufficiently above the melting point of the fluoropolymer binder resin to prevent both substances from melting and producing a continuous melted phase rather than the usually desired multi phase system.

The ratio of polymer binder particles to active particles or fibers is from 0.01-30 weight percent of fluoropolymer solids to 70 to 99.99 weight percent active particles or fibers, preferably from 0.1-14 weight percent of fluoropolymer solids to 86 to 99.9 weight percent active particles or fibers, more preferably from 0.2-8 weight percent of fluoropolymer solids to 92 to 99.8 weight percent active particles or fibers, and in one embodiment from 0.3-6 weight percent of fluoropolymer solids to 94 to 99.7 weight percent active particles or fibers. If less fluoropolymer is used, complete interconnectivity may not be achieved, and if more fluoropolymer is used, there is a reduction in surface area contact between the active particles and the fluid passing through the separation article. The efficient use of the polymer particle binder due to good distribution, small particle size and low agglomeration, allows for the effective amount of binder to be decreased over polymer binders of larger particle size, less efficient distribution and higher agglomeration, as found in the art.

In one embodiment, the primary active particles can exist as sub-micron particles and be held together by sub-micron polymer particles, without additional secondary functional particles. Another anticipated possibility is the use primary active material (like activated carbon) having more than one average particle size. The use of smaller particles places less pressure on each particle, reducing the chances of particle cracking.

Secondary functional additive particles

In addition to the polymer binder particles and primary active particles making up the majority of the porous article, one or more functional additives may be added in order to add additional functionality to the article. These additives provide the porous separation article with additional functionality for biological inception, metal adsorption, metal precipitation, physical filtration, catalytic activity, ion exchange, enzyme conversion, enzymes, antibodies, bacteria & virus rejection, and proteins immobilized on a support substrate. Many of these additives have particle sizes in the range of 5 to 10,000 nm, preferably from 10 to 5,000 nm, more preferably from 20 nm to 1,000 nm, and more preferably from 25 to 500 nm, enabling a large surface area for interaction with the fluid. While it is possible to use very low loadings of less than 1 weight percent with binder particles averaging over 5 microns based on the total weight of the porous article, by using nano-particle sized binder, it is possible to have loading levels of nanoparticles of greater than 1 weight percent, greater than 5 weight percent, and even greater than 10 weight percent.

Examples of useful microbiological inception agents include, but are not limited to metal salts, particularly silver and copper salts, including AgBr, AgCl, and silver zeolite. Other useful secondary functional additives include iron hydroxyoxide—for the adsorption of arsenic, calcium hydroxyapatite—for the adsorption of fluorine, and phosphates, oxides and sulfates—for the precipitation of metals such as lead, nickel and other toxic metals.

Process

The components of the solid porous article can be blended in several different ways. For example, one or more primary and/or secondary particles can be added to a polymer emulsion, followed by drying of the composite. The polymer latex can be diluted to 4-25 weight percent of solids, and preferably from 10 to 20 weight percent solids by the addition of water with stirring. The dilution allows for a better dispersion with the active particles, and decreases the likelihood of polymer particle agglomeration. One or more types of active materials and functional particles are then added to the diluted latex with adequate stirring to form a homogeneous aqueous dispersion of the polymer particle and interactive materials. This process works well for particles that are not water sensitive or hydrophobic, but does not work well for particles, such a molecular sieves, that are known to absorb water or hygroscopic, and which could become clogged on addition to a latex.

The primary active particles can be dry-blended with the functional additive particles prior to addition to the diluted polymer latex, or each of the types of particles can be directly added to the diluted latex. Preferably, the particulate materials are first dispersed in water prior to addition into the polymer latex. In an alternative embodiment, the particle materials can be added to the polymer latex, and the admixture diluted with water. In another alternative embodiment, the non-water sensitive particles can be added and dispersed into a latex. The latex can then be dried in which the moisture sensitive particles can now be added and blended into the dried latex formulation.

The dispersion blend is dried to form a composite of the primary active materials with the sub-micron polymer binder particles with the functional additive particles on the surface. The drying step can be done by any known method that will form the composite with the formation of less than 10 weight percent, and preferably less than 5 weight percent of polymer agglomerates. Drying generally uses heat and/or vacuum to remove the water and produce the composite. In one embodiment, the dispersion blend is spray-dried to form the composite. Dried polymer particle agglomerates in the 5-300 micron average particle size range can result from agglomeration of the 20-500 nm average polymer binder particles. Preferably the agglomerates are kept to a minimum. In another embodiment, the blend dispersion is poured onto a belt conveyor and a combination of vacuum and heat (generally an oven) is used to drive off the water, and to sinter the polymer particles to the interactive material. The flat sheet structure formed can then be collected and rolled into semi-finished good which could be die cut to dimensions or pleated and further wrapped into filtration cartridges.

The polymer binder can also be used in a powder form, and blended with the primary and secondary particles. In one embodiment, it has been found to be advantageous to blend specific secondary particles with the polymer as a first step, where the secondary particles have an average particle size of less than the particle size of the individual polymer binder agglomerated particles. It was found that when small inorganic salt or silicates, such as calcium carbonate, particles were added to 3 to 20 micron PVDF agglomerates, that the calcium carbonate helped to cleave the PVDF agglomerates into individual sub-micron particles, with light physical blending with a spatula. The primary particles can then be added to the polymer binder/secondary particle blend. This is especially useful when the primary particles tend to agglomerate with like materials rather than homogeneously disperse into the formulation matrix.

The dry composite composition of the invention can be formed into useful objects by any number of methods known in the art. The process should be one that may soften the polymer particles, but will not cause them to melt and flow to the point that they contact other polymer particles and form agglomerates or a continuous layer. To be effective in the contemplated end-uses, the polymer binder remains as discreet polymer particles that bind the interactive particles into an interconnected web, so gases and liquids can easily flow and contact the interactive materials.

In one embodiment, the dry composite material is applied to at least one surface of an electroconductive substrate to form an electrode or battery separator. The dry composite may be pressed onto said electroconductive substrate by means such as calendaring, such as described in U.S. Pat. Nos. 7,791,860, 8,072,734, and 8,591,601. In the process of the art, the polymer particles were dried and stored prior to blending with the active material, leading to agglomeration, and making uniform distribution of the polymer binder extremely difficult.

In one embodiment, the dry composite can be re-dispersed in an aqueous or solvent dispersion, by means of a dispersing aid, as known in the art. The polymer binder will remain uniformly distributed and in a non-agglomerated particle form as part of the composite. The dispersion can then be applied to an electroconductive substrate by a typical coating means, and dried to form an electrode or separator for a battery.

In another embodiment, the polymer binder particles, primary active particles and secondary functional additive particles can be formed into a porous block article in an extrusion process, such as that described in U.S. Pat. No. 5,331,037. The polymer binder composite of the invention is dry-blended with other additives, such as processing aids, and extruded, molded or formed into articles. Continuous extrusion under heat, pressure and shear while can produce an infinite length 3-dimensional multi phase profile structure consisting of binder, interactive particles, air, and/or other additives.

In order to form the continuous web of forced-point bonding of binder to the interactive materials, a critical combination of applied pressure, temperature and shear is used. The composite and additive blend is brought to a temperature above the softening temperature of the binder, significant pressure applied to consolidate the materials, and enough shear to spread the binder and form a continuous web. The porous block article is useful for separation and filtration of liquid and gaseous streams.

In yet another embodiment, the composite is formed into a dry sheet on a conveyor belt, and the sheet formed into articles.

In another embodiment, the blend can be added to a compression molder under sufficient heat and pressure to bind the composite blend into a multi-phase system of binder, interactive particle, air, and/or other additives.

In one embodiment, a non-compression molding process is used to form the composite particulate powder into a final article, where the non-compression process uses only gravity, and no added compression force.

Uses

Due to the advantageous properties of fluoropolymer and polyamide materials, including chemical inertness, biological purity, and excellent mechanical and thermo mechanical properties, compared to other binder materials, such as the typically used polyethylene, the separation articles of the invention can be used in a variety of different and demanding environments. High temperatures, highly reactive, caustic or acidic environments, sterile environments, contact with biological agents, are environments where the separation articles of the invention have distinct advantages over other polymer binder systems. The separation articles can be used to purify and remove unwanted materials from the fluid passing through the separation article, resulting in a more pure fluid to be used in various commercial or consumer applications. The separation article can also be used to capture and concentrate materials from a fluid stream, these captured materials then removed from the separation article for further use. The separations devices can be used for potable water purification (hot and cold water), and also for industrial uses. By industrial uses is meant uses at high temperatures (greater than 50° C., greater than 75° C., greater than 100° C. greater than 125° C. and even greater than 150° C., up to the softening point of the polymer binder; uses with organic solvents, and in pharmaceutical and biological clean and pure uses.

Separation articles of the invention can be any size or any shape. In one embodiment, the article is a hollow tube formed by a continuous extrusion of any length. Water or other fluid flows under pressure through the outside of the tube, and is filtered from the outside to inside of the tube, and is collected after passing through the filter.

Some articles of the invention include, but are not limited to:

Oil filters, in which the composite latex can be coated onto the paper filter medium.

Carbon block filtration systems, including for the reduction of heavy metals, reduction of antimicrobials, reduction of ionic contaminants, and reduction of pharmaceuticals Ion exchange membranes or columns.

Catalysis media for promoting chemical reactions.

Bioseparation and recovery of pharmaceutical and biological active ingredients.

Gas separation, both from other gases, of gases dissolved in aqueous and non-aqueous media, and particulates suspended in gas.

Chemical scrubbers, particularly for flue gasses in a very acidic environment.

Chemical resistant protective clothing and coverings.

Hot water process (>80° C.) filtration for antiscale build-up and removal of organic contaminants.

Automotive exhaust filtration.

Closed loop industrial water systems.

Industrial water treatment.

Exhaust, vent and chimney capture of greenhouse gases.

Treatment of contaminated groundwater.

Treatment of brine and saline water to potable water.

Use as a particulate filter.

Treatment in ozone exposure

The purification and/or filtration of:

aliphatic solvents, strong acids, hot (>80° C.) chemical compounds, hydrocarbons, hydrofluoric acid, diesel and biodiesel fuels, ketones, amines, strong bases, "fuming" acids, strong oxidants, aromatics, ethers, ketones, glycols, halogens, esters, aldehydes, and amines, compounds of benzene, toluene, butyl ether, acetone, ethylene glycol, ethylene dichloride, ethyl acetate, formaldehyde, butyl amines, etc.

Potable water filtration, including filtration of salt water, well water, and surface water.

Evaporation control devices.

Hydrocarbon energy storage devices

The removal of inorganic and ionic species from aqueous, non-aqueous, and gaseous suspensions or solutions, including but not limited to cations of hydrogen, aluminum, calcium, lithium, sodium, and potassium; anions of nitrate, cyanide and chlorine; metals, including but not limited to chromium, zinc, lead, mercury, copper, silver, gold, platinum, iron and other precious or heavy metal and metal ions; salts, including but not limited to sodium chloride, potassium chloride, sodium sulfate; and removal of organic compounds from aqueous solutions and suspensions.

Based on the list of exemplary uses, and the descriptions in this description, one of ordinary skill in the art can imagine a large variety of other uses for the composite solid article of the invention.

EXAMPLES

Example 1

73 wt % diatomaceous earth (average particle size of 44 micron), 16 wt % Kyblock® homopolymer fluoropolymer binder (average particle size of 5 micron agglomerate) with a melt viscosity of 20 kpoise at 232° C. at 100 s$^{-1}$ per ASTM D 3835, and 11 wt % of calcium hydroxyapatite (average particle size of 250 nm) was dry blended into a homogeneous mixture. The blend was then run through an extruder at 450° F. at 2 inches per minute under moderate pressure and then cooled. The part was a porous tubular structure which had substantial mechanical strength in terms of crush resistance.

Example 2

81.8 wt % diatomaceous earth (average particle size of 44 micron), 14.6 wt Kyblock® homopolymer fluoropolymer binder (average 5 micron agglomerate), with a melt viscosity of 20 kpoise at 232° C. at 100 s$^{-1}$ per ASTM D 3835 and 3.5 wt % calcium carbonate (average particle size of 3.5 micron) was dry blended into a homogeneous mixture. The blend was then compression molded at 180° C. for 1 min under low packing pressure of 300 psi. The sample was extracted from the compression mold and cured at 180° C. for 10 mins in an oven. The results was a porous rod structure which had substantial mechanical strength in terms of bend resistance.

Example 3

74 wt % diatomaceous earth (average 44 micron), 14 wt % Kyblock® homopolymer fluoropolymer binder (average particle size of 5 micron agglomerate), with a melt viscosity of 20 kpoise at 232° C. at 100 s$^{-1}$ per ASTM D 3835 3 wt % $CaCO_3$ (average particle size of 3.5 micron), 4 wt % TMAC—an apatite salt from Arkema Inc. (average particle size of 250 nm), and 1 wt % silver zeolite (average particle size of 3.5 micron) was dry blended into a homogeneous mixture. The blend was then run through an extruder at 450° F. at 2 inches per minute under moderate pressure and then cooled. The part was a porous tubular structure which had substantial mechanical strength in terms of crush resistance.

Example 4

81 wt % diatomaceous earth (average particle size of 44 micron), 14 wt % Kyblock® homopolymer fluoropolymer binder (average particle size of 5 micron agglomerate), with a melt viscosity of 20 kpoise at 232° C. at 100 s$^{-1}$ per ASTM D 3835 3 wt % CaCO$_3$ (average particle size of 3.5 micron) was dry blended into a homogeneous mixture. The blend was then run through an extruder at 450° F. at 2 inches per minute under moderate pressure and then cooled. The part was a porous tubular structure which had substantial mechanical strength in terms of crush resistance.

Example 5

12 wt % Kyblock® homopolymer fluoropolymer binder (average particle size of 5 micron agglomerate), with a melt viscosity of 20 kpoise at 232° C. at 100 s$^{-1}$ per ASTM D 3835, 8 wt % SZT (Arkema Inc.) having 3-4 micron particle size, 80 wt % activated carbon 20 to 325 mesh was dry blended into a homogeneous mixture. The blend was then placed into a mold at 520 F for 30 minutes under low pressure. The mold was removed from the oven and <1000 psi pressure was applied for 2 minutes. The mold was allowed to cool until 250 F and then the part was extracted from the mold.

Example 6

12 wt % Kyblock® homopolymer fluoropolymer binder (average particle size of 5 micron agglomerate), with a melt viscosity of 20 kpoise at 232° C. at 100 s$^{-1}$ per ASTM D 3835, 10 wt % TMAC having 1-10 micron particle size, 88 wt % activated carbon 20 to 325 mesh was dry blended into a homogeneous mixture. The blend was then placed into a mold at 520 F for 30 minutes under low pressure. The mold was removed from the oven and <1000 psi pressure was applied for 2 minutes. The mold was allowed to cool until 250 F and then the part was extracted from the mold.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Aspects of the invention include:
1. A solid porous article comprising:
    a) a thermoplastic polymeric binder in the form of particles having an average particle discrete size of from 20 nm to 1 micron, preferably 50 to 400 nm, and most preferably 50-300 nm, and
    b) at least 50 weight percent, preferably 60 weight percent, preferably 70 weight percent of primary active particles, and
    c) greater than 0.5 weight percent, preferably at greater than 0.7 weight percent, more preferably greater than 1.0 weight percent, preferably greater than 5 weight percent, and more preferably greater than 10 weight percent, based on the total weight of the solid porous article, of secondary functional additive particles having an average particle size of from 5 nm to 10,000 nm, preferably from 10 to 5,000 nm, more preferably from 20 to 1,000 nm, and most preferably from 25 to 1,000 nm.
2. The solid porous article of aspect 1, wherein said thermoplastic binder is present at from 1 to 30 weight percent, preferably 3-20 weight percent, and more preferably 5-14 wt percent, based on the total weight of the solid porous article.
3. The solid porous article of aspects 1 or 2, wherein said primary active particles are selected from the group consisting of activated alumina, activated carbon, carbon nanotubes, silica gel, acrylic powders and fibers, cellulose fibers, glass beads, abrasives, minerals, silica, wood chips, ion-exchange resins, molecular sieves, inorganic salts, ceramics, zeolites, ion-exchange modified zeolites, metal oxides, silver-based compounds, diatomaceous earth, talc polyester particles and fibers, engineering resin particles, and polycarbonate, wherein at least 3 weight percent of the primary active particles, preferably at least 5 weight percent, preferably at least 10 weight percent and preferably at least 20 weight percent of the primary particles has an average particle size of less than 1 micron, preferably less than 750 microns, more preferably less than 500 microns.
4. The solid porous article of any of the preceding aspects, wherein said functional additive particles are selected from biological inception agents, metal adsorption agents, metal precipitation agents, physical filtration agents, catalysts, ion exchange resins, enzymes, antibodies, and proteins immobilized on a support substrate.
5. The solid porous article of any of the preceding aspects, wherein said primary active particles are bimodal, with the average particle size of one mode being below 1 micron, and the average particle size of the other mode being above 1 micron.
6. A method for forming the solid porous article of aspect 1, comprising
    a) blending the thermoplastic binder particles, primary active particles, and functional additive particles,
    b) heating said blend to soften the binder particles, and
    c) forming the heated blend into a solid, porous article.
7. The method of aspect 6, wherein said thermoplastic binder particles are in the form of a dispersion when blended with the active particles and/or the functional additive particles.
8. The method of aspect 7, wherein said dispersion blend is dried in a spray dryer.
9. The method of any of aspects 6 to 8, wherein said binder particles are in the form of a powder, and are dry-blended with the active particles.
10. The method of any of aspects 6 to 9, wherein said heating and forming steps occur in an extrusion process.
11. The method of any of aspects 6 to 9, wherein said heating and forming steps occur in a compression molding process.
12. The method of any aspects 6 to 9, wherein said heating and forming steps occur in a non-compression molding process

What is claimed is:
1. A solid porous article comprising:
    a) a thermoplastic polymeric binder in the form of particles having an average particle discrete size of from 20 nm to 1 micron, and
    b) at least 50 weight percent of primary active particles, and
    c) greater than 0.5 weight percent of secondary functional additive particles comprising calcium hydroxyapatite having an average particle size of from 25 nm to 500 nm.
2. The solid porous article of claim 1, wherein said solid porous article comprises greater than 1.0 weight percent, based on the total weight of the solid porous article, of secondary functional additive particles.

3. The solid porous article of claim 2, wherein said solid porous article comprises greater than 10 weight percent, based on the total weight of the solid porous article, of secondary functional additive particles.

4. The solid porous article of claim 1, wherein said thermoplastic binder is present at from 1 to 30 weight percent, based on the total weight of the solid porous article.

5. The solid porous article of claim 4, wherein said thermoplastic binder is present at from 5-14 wt percent, based on the total weight of the solid porous article.

6. The solid porous article of claim 1, wherein said primary active particles are selected from the group consisting of activated alumina, activated carbon, carbon nanotubes, silica gel, acrylic powders and fibers, cellulose fibers, glass beads, abrasives, minerals, silica, wood chips, ion-exchange resins, molecular sieves, inorganic salts, ceramics, zeolites, ion-exchange modified zeolites, metal oxides, silver-based compounds, diatomaceous earth, talc polyester particles and fibers, engineering resin particles, and polycarbonate, wherein at least 3 weight percent of the primary active particles has an average particle size of less than 1 micron.

7. The solid porous article of claim 1, wherein said primary active particles are bimodal, with the average particle size of one mode being below 1 micron, and the average particle size of the other mode being above 1 micron.

8. A method for forming the solid porous article of claim 1, comprising
   a) blending the thermoplastic binder particles, primary active particles, and calcium hydroxyapatite particles,
   b) heating said blend to soften the binder particles, and
   c) forming the heated blend into a solid, porous article.

9. The method of claim 8, wherein said thermoplastic binder particles are in the form of a dispersion when blended with the active particles and/or the functional additive particles.

10. The method of claim 9, wherein said dispersion blend is dried in a spray dryer.

11. The method of claim 8, wherein said binder particles are in the form of a powder, and are dry-blended with the active particles.

12. The method of claim 8, wherein said heating and forming steps occur in an extrusion process.

13. The method of claim 8, wherein said heating and forming steps occur in a compression molding process.

14. The method of claim 8, wherein said heating and forming steps occur in a non-compression molding process.

15. The solid porous article of claim 1, comprising:
   a) a thermoplastic polymeric binder in the form of particles having an average particle discrete size of from 50-300 nm, and
   b) at least 70 weight percent of primary active particles.

* * * * *